(12) United States Patent
Wu et al.

(10) Patent No.: US 11,341,181 B2
(45) Date of Patent: May 24, 2022

(54) EDGE-COMPUTING-ORIENTED CONSTRUCTION METHOD FOR CONTAINER MIRROR IMAGE

(71) Applicant: HUAZHONG UNIVERSITY OF SCIENCE AND TECHNOLOGY, Hubei (CN)

(72) Inventors: Song Wu, Hubei (CN); Shengwei Bian, Hubei (CN); Hai Jin, Hubei (CN); Hao Fan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/012,392

(22) Filed: Sep. 4, 2020

(65) Prior Publication Data
US 2021/0216583 A1 Jul. 15, 2021

(51) Int. Cl.
*G06F 16/51* (2019.01)
*G06F 16/11* (2019.01)

(52) U.S. Cl.
CPC ............ *G06F 16/51* (2019.01); *G06F 16/122* (2019.01)

(58) Field of Classification Search
CPC ...... G06F 16/51; G06F 16/122; G06F 16/182; G06F 16/152; G06F 8/63; G06F 8/71; G06F 16/176; G06F 16/148; G06F 16/13; G06F 16/172
See application file for complete search history.

(56) References Cited

U.S. PATENT DOCUMENTS

| 6,748,504 | B2 * | 6/2004 | Sawdon | G06F 3/067 711/162 |
|---|---|---|---|---|
| 2017/0329683 | A1 * | 11/2017 | Lien | G06F 3/0619 |
| 2020/0302065 | A1 * | 9/2020 | Lawson | G06F 3/0635 |
| 2021/0271558 | A1 * | 9/2021 | Kumarasamy | G06F 11/1662 |

* cited by examiner

*Primary Examiner* — Cam Y T Truong
(74) *Attorney, Agent, or Firm* — Michael Ye; Rimon Law

(57) ABSTRACT

The present invention relates to an edge-computing-oriented construction method for a container image, and the construction method for a container image at least comprising steps of: having an image reconstruction module reconstruct an old container image so as to obtain a new container image comprising an index and a set of spare files that correspond to each other, and having an image management module store the index and the spare files separately from each other in an image repository and a spare file storage module respectively; having a download engine module scrape the index from the image repository to a corresponding container in the edge end, so that a container instance service module conducts search in a local file sharing module according to configuration information contained in the index and thereby retrieves a local shared file corresponding to the configuration information, an image file consulting module is configured to download a default file from the spare file storage module that does not exist in the local shared file retrieved according to the configuration information, and a service processor uploads the local shared file and the default file recorded according to the configuration information to the image reconstruction module, so that to match and to generate the index.

7 Claims, 5 Drawing Sheets

EDGE-COMPUTING-ORIENTED CONSTRUCTION METHOD FOR CONTAINER MIRROR IMAGE

CROSS-REFERENCE TO RELATED APPLICATIONS

This application claims the benefit of the Chinese Patent Application No. 202010013040.5 filed on Jan. 9, 2020, which is incorporated by reference as herein in its entirety.

BACKGROUND OF THE INVENTION

1. Technical Field

The present invention relates to computer application systems, and more particularly to an edge-computing-oriented construction method for a container image.

2. Description of Related Art

The container technology has become the norm for deployment of applications in cloud environments because of its fast initiation, lower resources overheads and lightweight resource isolation. Container as a lightweight technology is also more and more popular in edge computing. However, due to the fact that broadband networks in edge computing are smaller than those in cloud environments, the conventional method for constructing container images traditionally used in clouds is not suitable for edge computing scenarios because it is demanding in terms of bandwidth.

For example, China Patent Publication No. CN108399094A discloses a deployment method for applications, its deployment devices and it edge data center. The known method combines two virtualization technologies, virtual machine and container, to implement deployment for applications of different security levels. For an application with a high security level, its deployment is performed by activating the container in a virtual machine, and for an application with a low security level, its deployment is performed by activating the container in a physical machine. This approach advantageously combines safe isolation of a virtual machine and lightweight, fast deployment of a container, so as to get the best from the two schemes, thereby ensuring safe isolation for applications of different security levels.

Container images form a basis for activation of container instance services and contain all the data required by containers. Before activation of container instance services, complete container images have to be downloaded locally. A common Docker container framework implements a client-repository model. Therein, a client end manages the actual lifecycle of a container, including activation, pause, restoration and destruction. The repository end serves to centrally store container images to be deployed for the client end to acquire the required images freely.

Docker container images have a layered architecture. In other words, a container image is composed of multiple image layers, and each image layer stores a part of image data. When there is a need for a container instance service, all image layers are union mounted to one directory be means of a union file system, so as to provide the container instance with a complete view of the file system, thereby enabling the container to operate normally. The layered architecture is advantageous because when there is an identical image layer existing at local images, the image layer is not downloaded repeatedly. Instead, it is shared among the images. This not only reduces required the network and storage resources, but also speed up deployment of container instance services.

However, where preparing container images, a user often introduces much necessary data, making the image much greater than what is really need in terms of data size. Additionally, such a layered architecture tends to suffer from ineffective sharing because of its large sharing granularity. Therefore, such a layered architecture requires the entire image to be downloaded in the format of the local image before its activation, making it less efficient in practical use. This hinders the container technology from working in edge computing scenarios. Hence, there is a need for an edge-computing-oriented construction method for container images.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

As a solution to the foregoing problems, the present invention provides an edge-computing-oriented construction method for a container image, wherein the construction method for a container image at least comprising steps of: in a cloud, having an image reconstruction module reconstruct an old layered container image so as to obtain a new container image comprising an index and a set of spare files that correspond to each other, and having an image management module store the index and the spare files separately from each other in an image repository and a spare file storage module, respectively; in an edge end, during first-time deployment, having a download engine module scrape the index from the image repository to a corresponding container in the edge end, so that a container instance service module conducts search in a local file sharing module according to configuration information contained in the index and thereby retrieves a local shared file corresponding to the configuration information, and an image file consulting module is configured to download a default file from the spare file storage module that does not exist in the local shared file retrieved according to the configuration information, and a service processor uploads the local shared file and the default file recorded according to the configuration information to the image reconstruction module, so that the image reconstruction module is enabled to match the access file with the configuration information to generate the index.

According to one preferred embodiment, linking the default file and the local shared file to a private directory storage module of the container, so as to provide a root directory mount point for the container instance service module; when the container instance service module requests for a target file, having the private directory storage module request for a Hash value corresponding to the target file in the index according to the target file; and having the private directory storage module check whether there is a target file named after the Hash value in a private directory of the index, and if yes, loading the target file to the container instance service module; or if no, having the private directory storage module check whether there is the target file named after the Hash value in the local file sharing module, and if yes, linking the target file to the private directory of the index for the container instance service module to load; or if no, having the image file consulting module download the target file from the spare file storage module to the local file sharing module for the container instance service module to load.

According to one preferred embodiment, the image reconstruction module reconstructs the old image into the new image through reconstruction sub-steps of: performing union mount for the old image, and acquiring its complete file information; traversing the file information, and extracting contents of all regular files in the complete file system for their hash values, generating the spare files by means of extracting the contents of the regular files with the Hash value, and using the file system after replacement as the index; acquiring configuration information of the old image, wherein the configuration information at least includes environment variables, exposed ports numbers and volumes information and is used to construct the index; and using a service function of the server to upload accessed file information generated during service processing and the acquired configuration information to the image reconstruction module to construct the index.

According to one preferred embodiment, the service processor updates the index by means of: before performing service based on the configuration information, determining whether the configuration information is referred to for the first time; and if the index is not referred to for the first time, having the container instance service module activate the container without updating the index by means of requesting for the target file based on the index, thereby loading the target file from a private file in the private directory storage module of the index; or if the index is referred to for the first time, having the container instance service module activate the container after the image reconstruction module updates the index by means of requesting for the target file based on the index, thereby loading the target file from a private file in the private directory storage module of the index.

According to one preferred embodiment, in the cloud, when the image reconstruction module requests to upload the spare files, having the new image management module search for spare files already existing in the spare file storage module, so as to enable it to transmit the spare files that do not exist in the spare file storage module to the spare file storage module without repeatedly uploading the already existing spare files.

According to one preferred embodiment, the service processor sends the default file and the accessed local shared file to the image reconstruction module, and the image reconstruction module matches the default file and the accessed local shared file with the configuration information so as to update the index before the image management module stores the index into the image repository.

According to one preferred embodiment, the present invention further discloses an edge-computing-oriented construction system for a container image, so as to execute the above construction method.

The present invention provides an edge-computing-oriented construction method for container images and a system using the same, which at least has the following advantages:

(1) the present invention uses an on-demand acquisition method to effectively enhance deployment efficiency of containers and reduce use of network resources and of client storage resources while keeping the new images transparent to users;

(2) by caching data locally, the present invention allows local sharing when different containers require for the same data, thereby further reducing use of network/storage resources, and allows container applications to access local data directly, thereby ensuring I/O performance of the container applications; and (3) the present invention refines sharing from layer-level sharing to file-level sharing, because sharing of fine granularity significantly reduces use of storage resources of the image repository.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings, FIGS. 1 through 6.

For clarity, some technical terms used in this document are defined as below.

A container is an open-source engine, capable of packing software into standardized unit for use in development, interaction and deployment.

A container instance service (CIS) is an ideal execution load. With an image of a container of a program, the program can be run using some simple configurations and very low costs. Such as running program verification, scraping a website, deploying one Web service and so on, any container-enabled simple application can be deployed using CIS.

DockerHub is used for source code management and integration, and is also used to construct and test tools for reducing deployment cycles from days to minutes.

An image drive stores information related to container images, and uses the information and drive types of file systems (e.g. AUFS, OVERLAY, or OVERLAY2) to organize and manage data of affected layers.

An index is a separate physical object within a relational database. It stores a sorted list of values from one or a combination of fields with pointers to individual data records that contain those values.

Embodiment 1

Figure 1:
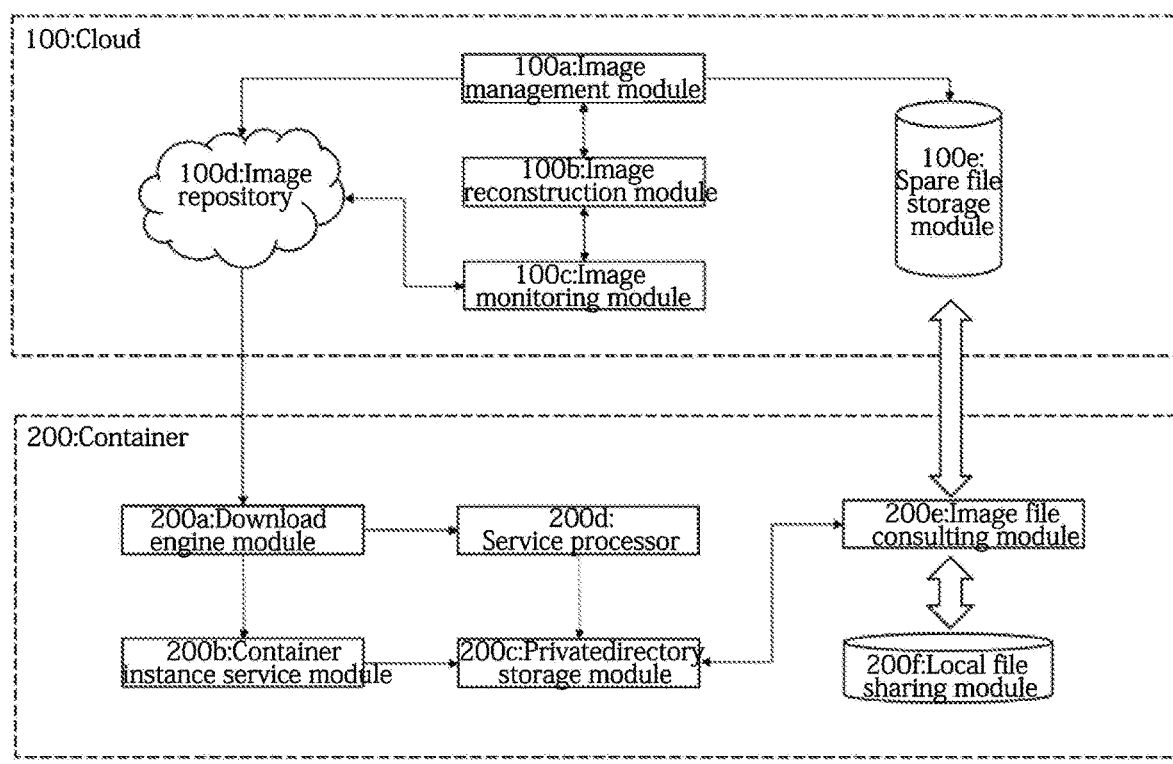
FIG. 1 shows a module structure of an edge-computing-oriented container image construction system according to the present invention.
Figure 2:
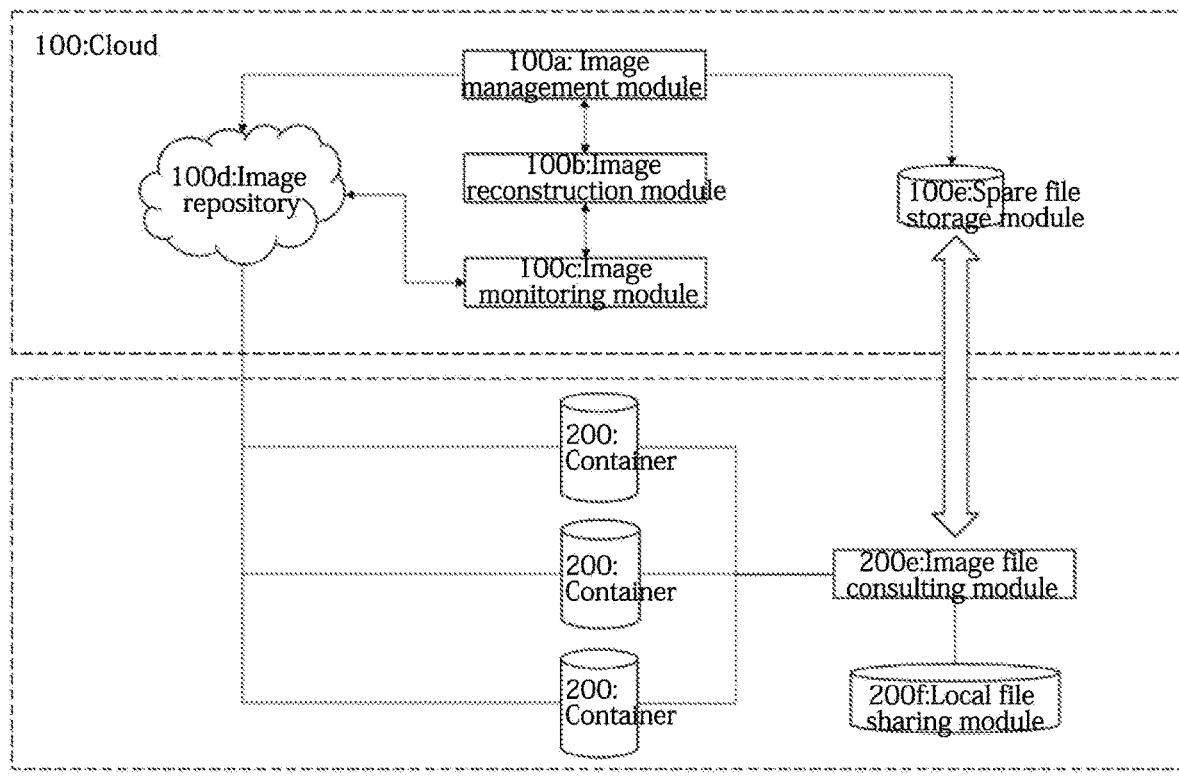
FIG. 2 shows an image construction module of the edge-computing-oriented container image construction system of the present invention.

The present embodiment discloses an edge-computing-oriented container image construction system. As shown in FIG. 1, the container construction system comprises a cloud 100 and an edge end. The cloud 100 and the edge end are capable of information interaction. As shown in FIG. 2, the edge end includes containers 200, an image file consulting module 200e, and a local file sharing module 200f. The container 200 includes a download engine module 200a, a service processor 200d, a private directory storage module 200c and a container instance service module 200b. As shown in FIG. 1, the cloud 100 at least comprises an image repository 100d, an image reconstruction module 100b, an image monitoring module 100c, an image management module 100a and a spare file storage module 10e.

Figure 3:
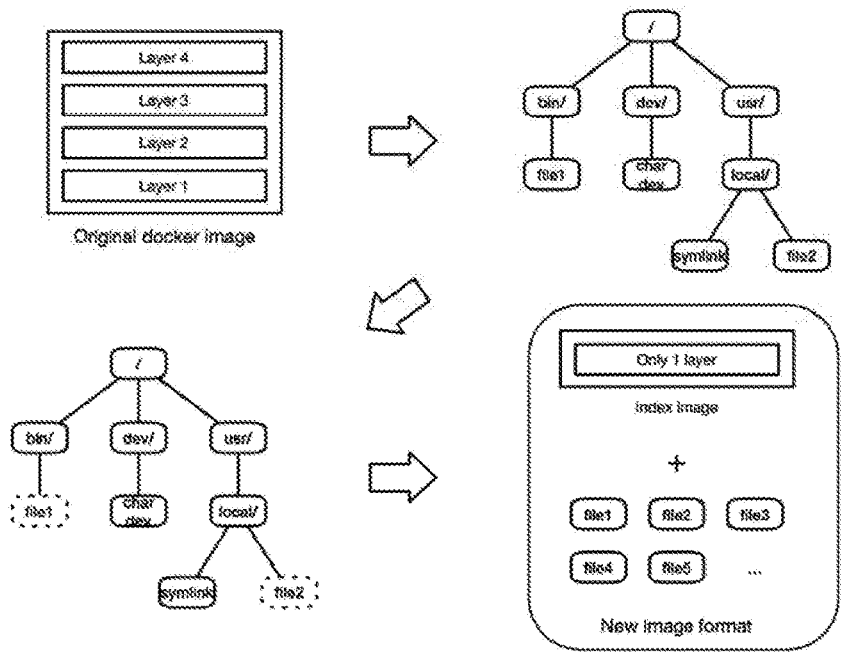
FIG. 3 illustrates a reconstruction method for a container image file according to the present invention.
Figure 4:
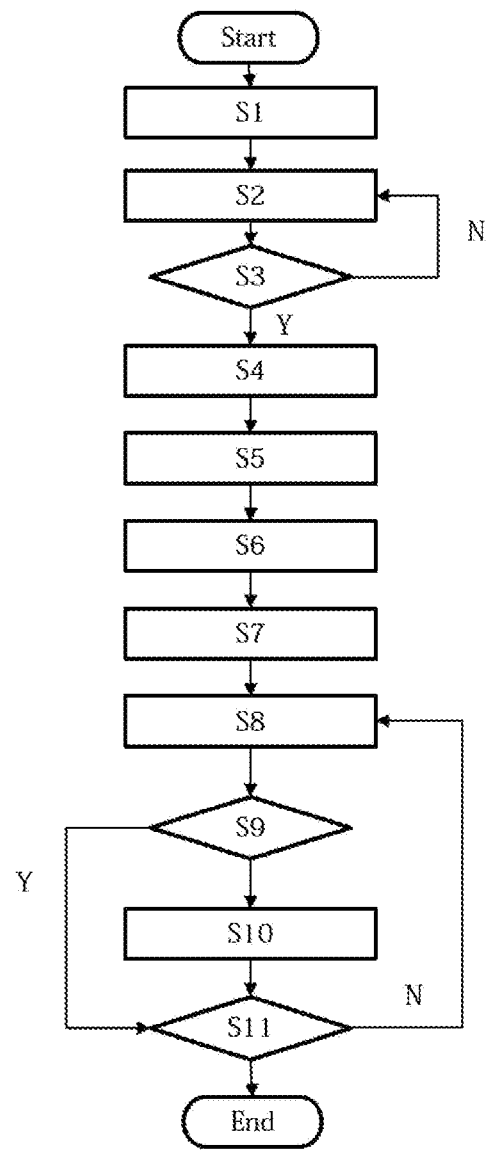
FIG. 4 is a detailed flowchart of reconstruction of an image and storage of a new image according to the present invention.
Figure 5:
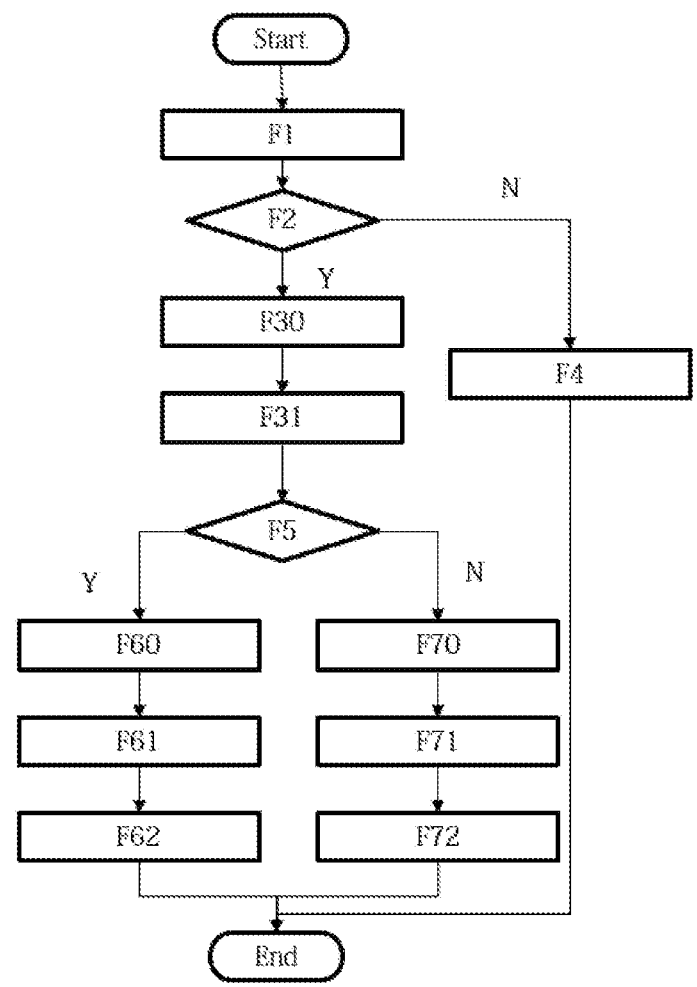
FIG. 5 is a detailed flowchart of deployment of the new image according to the present invention.
Figure 6:
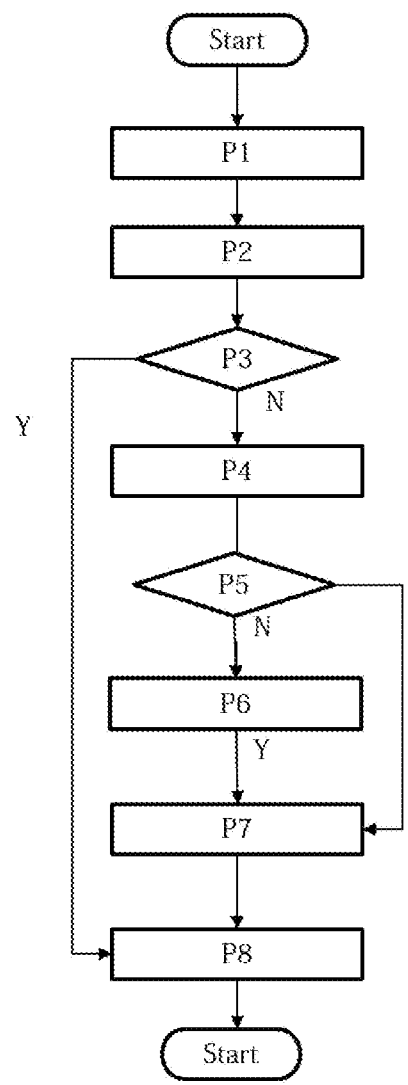
FIG. 6 is a detailed flowchart of on-demand acquisition of image data according to the present invention.

As shown in FIG. 1 and FIG. 3, the image reconstruction module 100b reconstructs the old container image into a new container image including an index and a set of spare files. The index and the spare files correspond to each other. The index is stored into the image repository 100d by the image management module 100a, for the corresponding container 200 in the edge end to download. The spare files are stored into the spare file storage module 100e by the image management module 100a, for on-demand download by the edge end. Preferably, the old container image may be a container image originally in the image repository 100d, or may be a newly added container image. For reconstructing the newly added container image, the cloud 100 is provided with an image monitoring module 100c, for monitoring and determining whether there is a newly added container image in the image repository 100d. If there is a newly added container image in the monitored image repository 100d, the image monitoring module 100c transmits the newly added container image to the image reconstruction module 100b for reconstruction. The index includes two parts: the configuration information and the file information with the regular file content extracted out.

During first-time deployment, the index is downloaded. The container instance service has to be activated according to the configuration information in the index, and it then search for and loads a file according to the Hash value of a regular file in the index. Since this is the first-time operation, all the files required by the container instance service have to be downloaded one by one according to the index. This is a time-consuming process because the file is transmitted through the network. Therefore, during first-time deployment, the files used by the container instance service are recorded, and this record is uploaded to the image reconstruction module where it is packed into the index. This process is known as updating. During subsequent deployment, since the downloaded index contains this record, the files required by the container can be all downloaded locally at one time before the container is activated, so as to accelerate container deployment.

As shown in FIG. 1 and FIG. 2, the download engine module 200a scrapes the index from the image repository 100d to the corresponding container 200 in the edge end. The container instance service module 200b searches a local shared file corresponding to the configuration information acquired from the local file sharing module 200f based on the configuration information in the index. In addition, the image file consulting module 200e can download the default file that does not exist in the local shared file as needed using the configuration information from the spare file storage module 100e. The service processor 200d sends the default file and the accessed local shared file to the image reconstruction module 100b. The image reconstruction module 100b matches the default file and the accessed local shared file with the configuration information so as to update the index. The image management module 100a stores the index to the image repository.

Preferably, private directory storage module 200c in the container 200 that has performed service on the old image in the edge end stores the default file and the local shared file. Thereby, the private directory storage module 200c provides the new image with a root directory mount point. Further, the container instance service module 200b can perform the container instance service simply by reading the index form the image repository in the cloud 100.

Preferably, the container instance service at least comprises the following steps. When the container instance service module 200b requests for a target file, the private directory storage module 200c reads the Hash value corresponding to the target file in the index. The private directory storage module 200c checks in the private directory of the index whether there is a target file named after the Hash value. If yes, the target file is loaded to the container instance service module 200b. Otherwise, the private directory storage module 200c checks whether there is a target file named after the Hash value in the local file sharing module 200f. If yes, the target file is linked to the private directory of the index for the container instance service module 200b to load. Otherwise, the image file consulting module 200e downloads the target file from the spare file storage module 100e to the local file sharing module 200f for the container instance service module 200b to load. In this way, during the container instance service, the corresponding target file can be downloaded in the edge end as much as possible based on the index, so as to decrease communication overheads between the cloud and the edge end.

Preferably, image reconstruction module 100b reconstructs old the image into the new image at least through the following reconstruction sub-steps: performing union mount on the old image, acquiring its complete file information; traversing the file information, extracting the contents of all the regular files for Hash operation, and using the Hash value to replace the content of the regular files so as to generate spare files and index image. The image reconstruction includes: performing union mount on the old image, and acquiring its complete file system. The file system is traversed to have the content of all the regular files extracted and stored as the spare files. The content of the regular files in the file system is replaced by Hash values. All configuration information of the old image is acquired, including environment variables, exposed port number, volume information. With the construction capability of the container engine, a new image is constructed from the processed file system and all the acquired configuration information, and this image is a single-layer image. This image is an index image, as shown in FIG. 3.

Embodiment 2

The present embodiment provides further improvements and/or supplements to Embodiment 1, and what is identical to its counterpart in the previous embodiment will not be repeated in the following description. Without causing conflict or contradiction, the entire and/or part of preferred modes of other embodiments may be incorporated into the present embodiment as supplements.

According to the present invention, reconstruction of Docker images primarily comprises the following steps:

1.1 performing union mount on layered Docker images;

1.2 traversing individual files in a root directory of the Docker images, and if the current file is a regular file, performing Hash operation on its content, using the Hash value so obtained to replace the file content, compressing the file content using gzip, naming the resulting file after the Hash value and using it as a set of spare files, wherein a file that is not a regular file is not changed and remains its architecture as a file system root directory;

1.3 packing the image root directory after the foregoing replacement; extracting a series of attributes of the Docker images, including information on environment variables, tags, the volume, the working directory, and the exposed ports; according to the information of the both, constructing a Docker file of the index and constructing an index of the new image with the assistance of the Docker construction function; and 1.4 pushing the new image index to the image repository and storing the spare files to the dedicated file storage system.

The overall architecture of the present invention is composed of two parts: a cloud 100 and a container 200. The cloud 100 primarily comprises three modules: an image monitoring module 100c, an image reconstruction module 100b and a new image management module 100a. The image monitoring module 100c serves to monitor the Docker image repository, and to submit the image information not reconstructed yet (i.e. the old image) to the image reconstruction module 100b. The image reconstruction module 100b reconstructs each Docker container image into a new image format: index file and spare files. Each spare file is stored in a compressed format, such as gzip, thereby reducing its storage occupation. The new image management module 100a serves to push the index file to the image repository 100d, and to store the spare files in the spare file storage module 100e. The edge end primarily comprises two modules: an image storage driver and an image file system. The image storage driver is developed as a plug-in, so that it can be easily installed and used. The image storage driver serves to store locally in a certain manner the container image data downloaded by the Docker engine, and serves to provide the root directory mount point for the container instance service during activation of the image storage driver. The image file system serves to perform union mount between the index of the new image and the spare files, and to show the complete view of the complete container root directory at the mount point of the container instance service root directory, so as to enable the container to read data normally and accurately.

Reconstruction of the Docker image and storage of the new image are primarily achieved through the following steps:

S1: activating the image monitoring module;

S2: having the image monitoring module 100c monitor the image repository 100d, wherein the image registry contains the image not reconstructed yet (i.e. the old container image) and the newly pushed image (i.e. the new container image);

S3: in the cloud 100, the image monitoring module 100c continuously monitoring the image repository 100d until the image monitoring module 100c recognizes the old container image from the image repository 100d when the image reconstruction module 100b is to be activated;

S4: once the image monitoring module 100c finds that there is an image not reconstructed yet in the image repository 100d, sending the image not reconstructed yet to the image reconstruction module 100b;

S5: having the image reconstruction module 100b download the image not reconstructed yet locally according to the obtained information, so as to prepare for reconstruction of the image;

S6: sending the reconstructed index and the spare files to the new image management module, S7: having the new image management module 100a push the index to the image repository;

S8: uploading the spare files to the file storage system.

S9-S11: preferably, in the cloud 100, having the new image management module 100a search for spare files existing in the spare file storage module 100e when the image reconstruction module 100b requests to upload spare files, so that the spare files not existing in the spare file storage module 100e are uploaded to the spare file storage module 100e with the spare files already existing not uploaded again, wherein, in the process of uploading the spare files, the file system is consulted so that only the files not uploaded yet are uploaded and no files are repeatedly uploaded.

Preferably, the service processor 200d constructs the index as described previously. Before the service is provided based on the configuration information, it is determined whether the configuration information is referred to for the first time. If the index is not referred to for the first time, the container instance service module 200b activates the container 200 without updating the index by means of requesting for the target file based on the index, thereby loading the target file from a private file in the private directory storage module 200c of the index. If the index is referred to for the first time, the container instance service module 200b activates the container 200 after the image reconstruction module 100b updates the index by means of requesting for the target file based on the index, thereby loading the target file from a private file in the private directory storage module 200c of the index. For example, this comprises:

F1: having the Docker engine pull the container image from the image repository to local and send the acquired data to the image storage driver;

F2: having the storage driver determine whether the image data to be stored locally is a Docker image or the index of a new image, and if it is a Docker container image, moving to steps F4, or otherwise, moving to steps F30;

F4: having the storage driver retrogress to the storage driver for the Docker container, storing the image data according to the Docker standard, using the file system as default in Docker to mount the container instance service root directory mount point, and moving to END;

F30: having the storage driver store the image data locally, and using the new image file system to perform union mount between the index and the spare files, thereby providing the container instance service with the root directory mount point;

F31: activating a new image container;

F5: determining whether it is the firs-time activation of the new image, if yes, proceeding with Step F60, or if no, proceeding with Step F70;

F60: recording all the files accessed by the container during its service,

F61: submitting the information to the image reconstruction module, wherein the service of the container is essentially reading files, and running files is done based on the index, with the search conducted in the order of the private directory and then the shared directory, in which if the result is found in the private directory, the file content is directly read and returned, or if the result is found in the shared directory, the result is first hard-linked to the private directory, and then returned from the private directory, or if the result is found in neither the private directory nor the shared directory, the result is acquired from a remote file server, stored into the shared directory, hard-linked to the private directory, and then returned from the private directory;

F62: having the image reconstruction module update the new image index according to the obtained file record information by adding the file record information to the new image index, and moving to END;

F70: having the storage driver check for the local shared directory for a file not existing locally according to the file record information;

F71: having the storage driver download the file not existing locally from the remote spare file storage system to the local shared directory;

F72: hard-linking all the files in the shared directory required by the container to the private directory of the new image; and END: ending/moving to reading the container data.

On-demand acquisition of the image data primarily comprises the following steps:

P1: having the new image container instance service request for a file;

P2: having the new image file system acquire the Hash value of the file in the new image index according to the file request;

P3: having the new image file system checking whether there is a file named after the Hash value in the private directory of the new image, if no, moving to P4, or otherwise, moving to P8;

P4: having the new image file system checking the local shared directory;

P5: determining whether there is a file named after the Hash value in the local shared directory, if no, moving to P6, or otherwise, moving to P7;

P6: downloading the target file form the remote spare file storage system to the local shared directory;

P7: linking the target file to the private directory of the new image by means of a hard link; and P8: returning the target file to the container instance service.

As used herein, the term "module" may refer to any kind of hardware, software or a combination of thereof, which is able to execute functions associated with the "module".

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. An edge-computing-oriented construction method for a container image, wherein the edge-computing-oriented construction method for a container image comprises steps of:

reconstructing, by an image reconstruction module executed on a computer system in a cloud, an old container image so as to obtain a new container image comprising an index and a set of spare files that correspond to each other, wherein the reconstructing the old container image into the new container image includes performing union mount for the old container image, and generating the spare files by replacing content of regular files with a Hash value;

storing, by an image management module executed on a computer system in the cloud, the index and the spare files separately from each other in an image repository and a spare file storage module, respectively; and in an edge end, during first-time deployment:

scraping, by a download engine module executed on a computer system, the index from the image repository to a corresponding container in the edge end, so that a container instance service module conducts a search in a local the sharing module according to configuration information of the old container image contained in the index and thereby retrieves a local shared file corresponding to the configuration information, wherein the configuration information includes environment variables, exposed port numbers and volume information;

downloading, by an image the consulting module executed on a computer system, a default file from the spare file storage module that does not exist in the local shared the retrieved according to the configuration information;

uploading, by a service processor via a network, the local shared file and recording the default file according to the configuration information to the image reconstruction module, so that the image reconstruction module is enabled to match the default the and the local shared the with the configuration information to update the index;

linking the recorded default file and the uploaded local shared file to a private directory storage module of the container, so as to provide the new contained image with a root directory mount point for the container instance service module;

when the container instance service module requests for a target file, requesting, by the private directory storage module executed on a computer system, the Hash value corresponding to the target the in the index according to the target file, and checking whether there is a target file named in a private directory of the index after reading the Hash value in a private directory of the index;

when the target file named to the container instance service module after reading the Hash value in the private directory index;

when the target file named is not in the private directory of the index, checking, by the private directory storage module whether there is the target file named in the local file sharing module after reading the Hash value in the local the sharing module, when the target the named is in the local file sharing module, linking the target file named to the private directory of the index for the container instance service module to load the target file from a private file into the private directory storage module of the index after reading the Hash value;

when the target the named is not in the local file sharing module, downloading, by the image file consulting module executed on a computer system, the target file named from the spare file storage module to the local the sharing module for the container instance service module to load the target the from the private file into the private directory storage module of the index; and activating in the cloud by the image reconstruction module in response to an image monitoring module recognizing the old container image in the image repository.

2. The construction method of claim 1, wherein the image reconstruction module further reconstructs the old container image into the new container image through reconstruction sub-steps of:
   acquiring the old container image's complete file information;
   traversing the complete file information and extracting content of a regular file in the complete file information for Hash operation;
   acquiring configuration information of the old container image, wherein the configuration information is used to construct the index; and
   using a service function of a server to upload accessed file information generated during service processing and the acquired configuration information to the image reconstruction module to construct the index.

3. The construction method of claim 2, wherein the service processor updates the index before performing service based on the configuration information, determining whether the configuration information is referred to for first time;
   and if the index is not referred to for the first time, having the container instance service module activate the container without updating the index by requesting for the target the based on the index, thereby loading the target the from a private the into the private directory storage module of the index; or
   if the index is referred to for the first time, having the container instance service module activate the container after the image reconstruction module updates the index by requesting for the target the based on the index, thereby loading the target file from a private file into the private directory storage module of the index.

4. The construction method of claim 3, comprising: in the cloud, when the image reconstruction module requests to upload the spare files, having new image management module search for spare files already existing in the spare file storage module, so as to enable the new image management module to transmit the spare files that do not exist in the spare the storage module to the spare file storage module without repeatedly uploading the already existing spare files.

5. The construction method of claim 4, wherein the service processor sends the default file and the local shared file to the image reconstruction module, and the image reconstruction module matches the default the and the local shared file with the configuration information so as to update the index before the image management module stores the index into the image repository.

6. An edge-computing-oriented construction system for a container image, comprising:
   a network;
   a cloud and an edge end that communicate with each other via the network, wherein in the cloud, an image reconstruction module configured to reconstruct an old container image so as to obtain a new container image comprising an index, wherein the reconstructing the old container image into the new container image includes performing union mount for the old container image, and generating the spare files by replacing content of regular files with a Hash value; and
   in the cloud, an image management module configured to store the index and the spare files separately from each other in an image repository and a spare file storage module, respectively; and
   in an edge end, during first-time deployment:
   a download engine module configured to scrape the index from the image repository to a corresponding container in the edge end, so that a container instance service module is configured to conduct a search in a local file sharing module according to configuration information of the old container image contained in the index and thereby retrieves a local shared file corresponding to the configuration information, wherein the configuration information includes environment variables, exposed port numbers and volume information;
   an image file consulting module configured to download a default the from the spare file storage module that does not exist in the local shared file retrieved according to the configuration information;
   a service processor configured to upload the local shared the and record the default the according to the configuration information to the image reconstruction module, so that the image reconstruction module is enabled to match the default the and the local shared the with the configuration information to update the index;
   the image reconstruction module linking the recorded default file and the uploaded local shared the to a private directory storage module of the container, so as to provide the new container image with a root directory mount point for the container instance service module;
   when the container instance service module requests for a target file, having the private directory storage module request for a the Hash value corresponding to the target file in the index according to the target file, and having the private directory storage module check whether there is a target file named in a private directory of the index after reading the Hash value in a private directory of the index;
   when the target file named is in the private directory of the index, loading the target the named in the private directory of the index to the container instance service module after reading the Hash value in the private directory of the index;
   when the target file named is not in the private directory of the index, having the private directory storage module check whether there is the target file named in the local file sharing module;
   when the target file named is in the local file sharing module, linking the target file named to the private directory of the index for the container instance service module to load the target file from a private file into the private directory storage module of the index;
   when the target file named is not in the local file sharing module, having the image the consulting module download the target file named from the spare file storage module to the local file sharing module for the container instance service module to load the target the from a private file into the private directory storage module of the index; and
   wherein in the cloud, the image reconstruction module is configured to be activated in response to an image monitoring module recognizing the old container image in the image repository.

7. The construction system of claim 6, wherein the image reconstruction module further reconstructs the old container image into the new container image through reconstruction sub-steps of:
   acquiring the old container image's complete the information;

traversing the information, and extracting content of a regular file in the complete file information for Hash operation;

using the regular file after replacement as the index;

acquiring configuration information of the old container image, wherein the configuration information is used to construct the index; and using a service function of the server to upload accessed the information generated during service processing and the acquired configuration information to the image reconstruction module to update the index.

* * * * *